United States Patent
Murakami et al.

(10) Patent No.: US 9,072,132 B2
(45) Date of Patent: Jun. 30, 2015

(54) LIGHTING CONTROL SYSTEM

(71) Applicant: PANASONIC CORPORATION, Osaka (JP)

(72) Inventors: Tadashi Murakami, Osaka (JP); Shigeo Gotoh, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 266 days.

(21) Appl. No.: 13/890,605

(22) Filed: May 9, 2013

(65) Prior Publication Data

US 2013/0313977 A1 Nov. 28, 2013

(30) Foreign Application Priority Data

May 28, 2012 (JP) .................................. 2012-121178

(51) Int. Cl.
*H05B 37/02* (2006.01)

(52) U.S. Cl.
CPC ........ *H05B 37/0227* (2013.01); *H05B 37/0254* (2013.01); *H05B 37/0272* (2013.01); *H05B 37/0281* (2013.01); *Y02B 20/72* (2013.01); *Y02B 20/42* (2013.01)

(58) Field of Classification Search
CPC ........... H05B 37/0227; H05B 37/0254; H05B 37/0272; H05B 37/0281; Y02B 20/42; Y02B 20/72
USPC .......................................... 315/153, 292, 312
See application file for complete search history.

(56) References Cited

U.S. PATENT DOCUMENTS

| | | | |
|---|---|---|---|
| 4,991,054 A * | 2/1991 | Walters | 361/165 |
| 6,119,076 A * | 9/2000 | Williams et al. | 702/188 |
| 6,191,568 B1 * | 2/2001 | Poletti | 323/268 |
| 7,369,056 B2 * | 5/2008 | McCollough, Jr. | 340/635 |
| 7,638,743 B2 * | 12/2009 | Bartol et al. | 250/205 |
| 8,344,665 B2 * | 1/2013 | Verfuerth et al. | 315/315 |
| 8,406,937 B2 * | 3/2013 | Verfuerth et al. | 700/296 |
| 8,450,670 B2 * | 5/2013 | Verfuerth et al. | 250/205 |
| 8,921,751 B2 * | 12/2014 | Verfuerth | 250/205 |
| 2012/0074842 A1 | 3/2012 | Hattori et al. | |

FOREIGN PATENT DOCUMENTS

| | | |
|---|---|---|
| CN | 101541123 A | 9/2009 |
| CN | 102393682 A | 3/2012 |
| JP | 10-334711 A | 12/1998 |

(Continued)

OTHER PUBLICATIONS

European Search Report for corresponding European Application No. 13002579.4 dated Jul. 17, 2013.

(Continued)

*Primary Examiner* — Kenneth Wells
(74) *Attorney, Agent, or Firm* — Renner, Otto, Boisselle & Sklar, LLP (57) ABSTRACT

A lighting control system includes lighting devices arranged along a road for a moving body. Each lighting device includes a sensor that detects a moving body approaching the lighting device, a light source that emits light, a sensor that detects the moving body, a control unit connected to the sensor and the light source, and a communication unit. The sensor of the one of the lighting devices located in at least at one outermost position of the lighting devices has a higher detection frequency than the sensors of the other lighting devices.

6 Claims, 4 Drawing Sheets

(56) References Cited

FOREIGN PATENT DOCUMENTS

| JP | 2005-050611 A | 2/2005 |
| JP | 2009-054496 A | 3/2009 |
| JP | 2009-259584 A | 11/2009 |
| JP | 2011-018466 A | 1/2011 |
| WO | WO 2009/003279 A1 | 1/2009 |
| WO | WO 2011/055259 A1 | 5/2011 |
| WO | WO 2011/113133 A1 | 9/2011 |

OTHER PUBLICATIONS

Chinese Office Action for corresponding Chinese Application No. 201310199295.5 dated Jan. 12, 2015, with English Translation.

* cited by examiner

LIGHTING CONTROL SYSTEM

CROSS-REFERENCE TO RELATED APPLICATIONS

This application is based upon and claims the benefit of priority from prior Japanese Patent Application No. 2012-121178, filed on May 28, 2012, the entire contents of which are incorporated herein by reference.

BACKGROUND OF THE ART

The present invention relates to a lighting control system that controls a lighting device.

A lighting control system controls the output of light from a lighting device on a road during the nighttime or in a tunnel based on the presence of a moving body such as a person or a vehicle (refer to, for example, Japanese Laid-Open Patent Publication No. 2009-54496).

The lighting control system of Japanese Laid-Open Patent Publication No. 2009-54496 includes a plurality of lighting devices provided with vehicle sensors that detect vehicles traveling along a road. The lighting devices are arranged along the road, or the travelling direction of vehicles. Each lighting device includes a communication unit that sends and receives vehicle detection information to and from other vehicle sensors. Further, each lighting device includes a control unit that controls the activation of a light source.

Each control unit activates the light source of the corresponding lighting device when the vehicle sensor detects a vehicle. Further, the control unit activates the light sources of the other lighting devices arranged along the travelling direction of the vehicle. When the vehicle sensor does not detect a vehicle, the light source remains deactivated. This decreases power consumption as compared to when the light source is constantly activated.

To further decrease power consumption, recent lighting control systems shorten the actuated time of a vehicle sensor that detects the presence of a moving body. However, when the actuated time of the sensor is shortened, a moving body is detected only when the sensor is actuated. As a result, the light source may not be accurately activated. For example, when the presence of a vehicle cannot be detected due to the short actuation time of the sensor, the light source may not be activated, the time until the presence of a moving body is detected may be lengthened, and the time for activating the light source may be lengthened.

SUMMARY OF THE INVENTION

One aspect of the present invention is a lighting control system including a plurality of lighting devices arranged along a road for a moving body. Each of the lighting devices includes a light source that emits light, a sensor that detects the moving body, a control unit provided with a detection result of the sensor, and a communication unit that sends and receives the detection result of the sensor to and from the communication unit of at least one of the other lighting devices. When the control unit of each lighting device receives the detection result indicating the detection of the moving body, the control unit controls the light source to be in a bright state and sends the detection result indicating the detection of the moving body from the corresponding communication unit to at least one of the other lighting devices. When the control unit of each lighting device receives the detection result indicating the detection of the moving body through the corresponding communication unit from another one of the lighting devices, the control unit controls the corresponding light source to be in a bright state. The sensor of the one of the lighting devices located in at least at one outermost position of the lighting devices is set to have a higher detection frequency than the sensors of the other lighting devices.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A lighting control system according to one embodiment of the present invention will now be described with reference to FIGS. 1 to 4.

Figure 1:
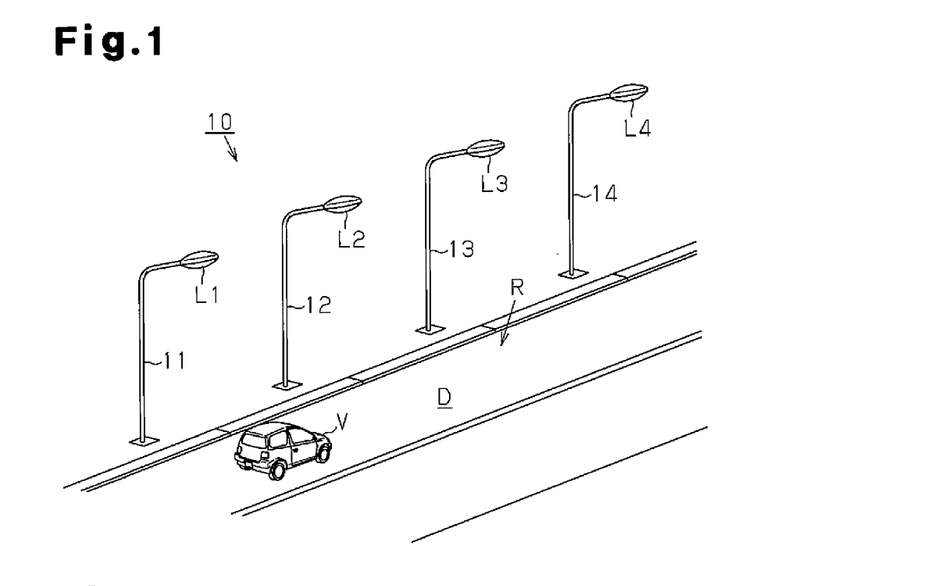
FIG. 1 is a perspective view of a lighting control system.

As shown in FIG. 1, a lighting control system 10 includes a plurality of (four in the present embodiment) lighting devices 11 to 14 arranged along a road R. A vehicle V, which functions as a moving body, travels along the road R. The lighting devices 11 to 14 are arranged along the travelling direction of the moving body. The lighting devices 11 to 14, which are identical to one another, will hereby be referred to as the first lighting device 11, the second lighting device 12, the third lighting device 13, and the fourth lighting device 14. The lighting control system 10 accurately recognizes when the vehicle V enters section D, which extends from the first lighting device 11 to the fourth lighting device 14.

Figure 2:
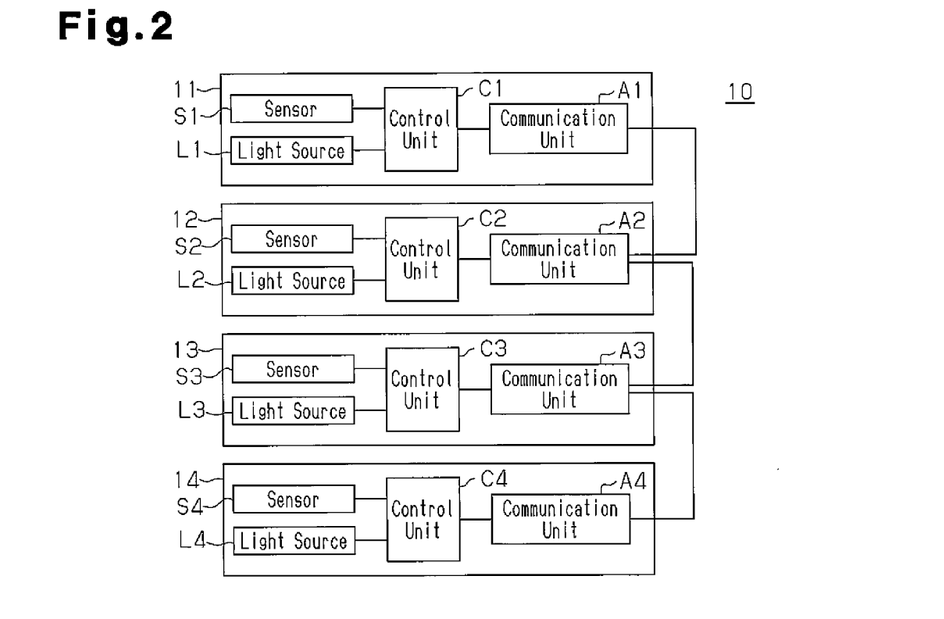
FIG. 2 is a block diagram showing the electrical configuration of the lighting control system.

Referring to FIG. 2, the lighting devices 11 to 14 include sensors S1 to S4, light sources L1 to L4, control units C1 to C4, and communication units A1 to A4, respectively. The sensors S1 to S4 (e.g., radio wave active sensors, infrared active sensors, or passive sensors, such as passive infrared sensors) detect a moving body approaching the corresponding lighting devices 11 to 14. The light sources L1 to L4 emit light. The control units C1 to C4 are connected to the sensors S1 to S4 and the light sources L1 to L4, respectively. Each of the control units C1 to C4 includes a memory. The memories store programs for controlling the output of light from the corresponding light sources and programs for determining whether or not the corresponding lighting devices 11 to 14 are arranged at one of two outermost end positions of the lighting devices 11 to 14. The communication units A1 to A4 are connected to the control units C1 to C4, respectively. The sensor S1, the control unit C1, the light source L1, and the communication unit A1 of the first lighting device 11 will hereafter be referred to as the first sensor S1, the first control unit C1, the first light source L1, and the first communication unit A1. Reference to the components of the second lighting device 12, the third lighting device 13, and the fourth lighting device 14 will be made in the same manner.

The communication units A1 to A4 are connected to the communication units A1 to A4 of the adjacent lighting devices 11 to 14 located at on one side or two opposite sides of the corresponding lighting devices 11 to 14. Specifically, the first communication unit A1 is connected to the second communication unit A2. The second communication unit A2 is connected to the first communication unit A1 and the third communication unit A3. The third communication unit A3 is connected to the second communication unit A2 and the fourth communication unit A4. The fourth communication unit A4 is connected to the third communication unit A3. The communication units A1 to A4 are in wired or wireless connection with one another.

When the sensors S1 to S4 detect a moving body, the corresponding control units C1 to C4 send the detection result from the corresponding communication units A1 to A4 to the communication units of the one or two adjacent lighting devices 11 to 14. When receiving the detection result indicating the detection of a moving body, the control units C1 to C4 further send the detection result to the communication unit of the one of the lighting devices 11 to 14 located at the opposite side of the lighting device including the communication unit that sent the original detection result. When receiving the detection result indicating the detection of a moving body, the control units C1 to C4 activate the corresponding light sources L1 to L4. After the detection of the moving body, the control units C1 to C4 deactivate the light sources L1 to L4 when a moving body is not detected for a certain time or longer.

The sensors S1 to S4 perform detections at different frequencies so that the lighting control system 10 accurately detects the entrance of a moving body into the section D and decreases power consumption. In the present embodiment, the first sensor S1 of the first lighting device 11 and the fourth sensor S4 of the fourth lighting device 14, which are located at the two outermost positions of the lighting devices 11 to 14, are activated in frequencies (activation time) that differ from the second sensor S2 of the second lighting device 12 and the third sensor S3 of the third lighting device 13, which are separated from the two outermost positions. The detection frequency of the first sensor S1 and the fourth sensor S4 is higher than the detection frequency of the second sensor S2 and the third sensor S3 (other sensors) to accurately detect a moving body. The second sensor S2 in the second lighting device 12 and the third sensor S3 in the third lighting device 13 have a low detection frequency to decrease power consumption of the lighting control system 10.

In the present embodiment, the control units C1 to C4 set the detection frequencies of the corresponding sensors S1 to S4 by determining whether or not the corresponding lighting devices 11 to 14 are located at any one of the two outermost positions of the lighting devices 11 to 14. This will now be described in detail.

The control units C1 to C4 check the connection conditions of the corresponding communication units A1 to A4. When two of the communication units A1 to A4 are connected to the corresponding one of the communication units A1 to A4, each of the control units C1 to C4 determines that the corresponding one of the lighting devices 11 to 14 is not located at one of the two outermost positions. In the present embodiment, the second lighting device 12 and the third lighting device 13 are separated from the two outermost positions. Thus, lighting devices are present at two opposite sides of each of the second lighting device 12 and the third lighting device 13. In contrast, the first lighting device 11 and the fourth lighting device 14 are arranged at the two outermost positions. Thus, a lighting device is present at only one side of each of the first lighting device 11 and the fourth lighting device 14. As a result, when connecting the communication units A1 to A4 of two of the lighting devices 11 to 14 that are adjacent to each other, each of the communication units A1 and A4 in the lighting devices 11 and 14 located at the two outermost positions has only one communication peer. In this case, each of the communication units A2 and A3 in the lighting devices 12 and 13 has two communication peers. Accordingly, the first control unit C1 and the fourth control unit C4 determine that the first lighting device 11 and the fourth lighting device 14 are located at the two outermost positions. Further, the second control unit C2 and the third control unit C3 determine that the second lighting device 12 and the third lighting device 13 are separated from the two outermost positions.

Figure 3:
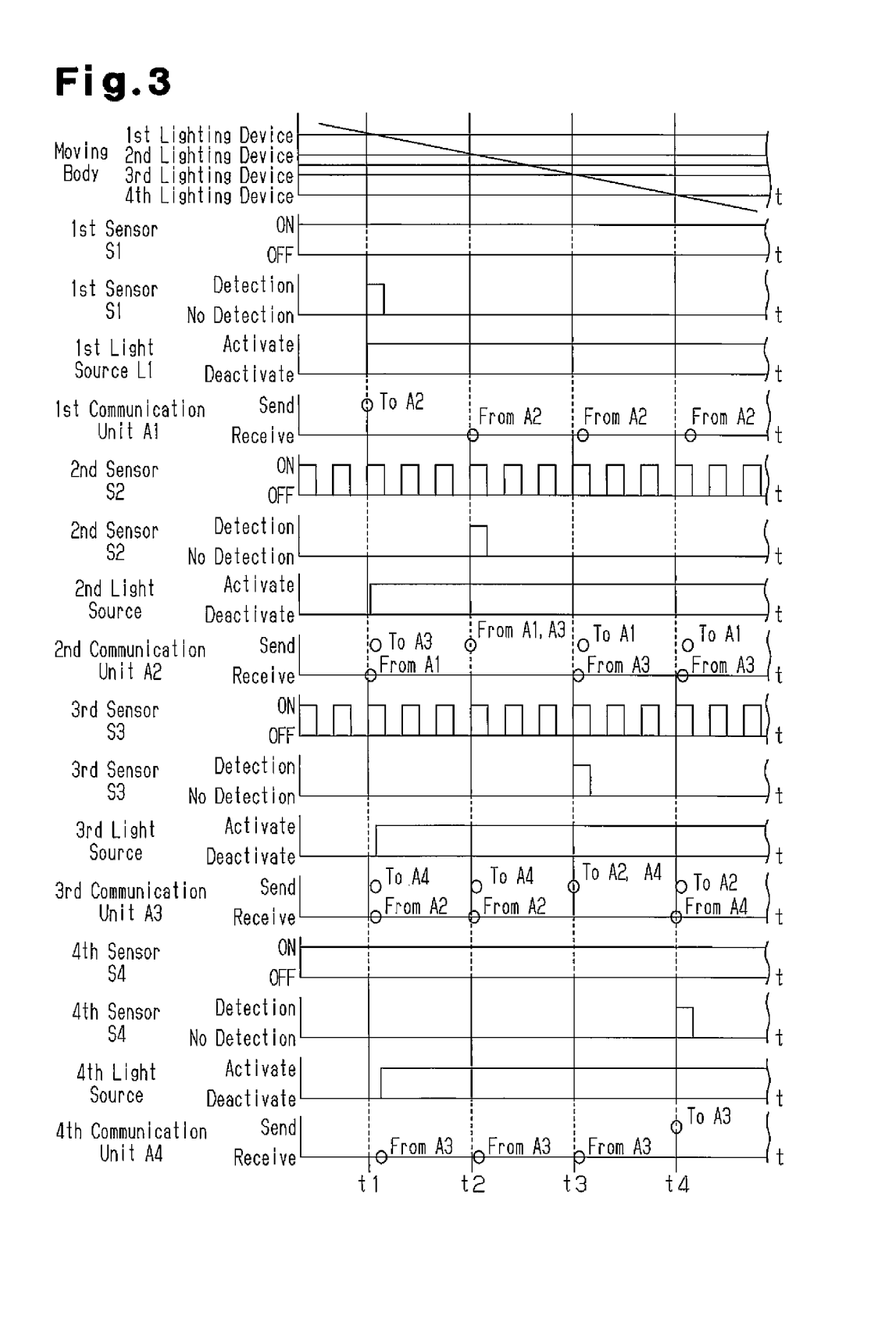
FIG. 3 is a time chart illustrating the control executed by a control unit of the lighting control system.

Referring to FIG. 3, the first control unit C1 and the fourth control unit C4 constantly actuate (turn ON) the first sensor S1 and the fourth sensor S4. When a moving body enters the section D, the moving body will first pass by either one of the lighting devices 11 and 14 located at the two outermost positions. Since the sensor S1 and S4 of the lighting devices 11 and 14 are constantly actuated, a situation in which none of the light sources L1 to L4 of the lighting devices 11 to 14 are activated when the moving body enters the section D will be avoided.

The second control unit C2 and the third control unit C3 actuate (turn ON) the second sensor S2 and the third sensor S3 in fixed cycles and then de-actuate (turn OFF) the second sensor S2 and the third sensor S3. Accordingly, the second sensor S2 and the third sensor S3 are activated (turned ON) in fixed cycles for a predetermined period. The period is stored in the memories of the control units C1 to C4 and set based on the distance between adjacent ones of the lighting devices 11 to 14, the time until deactivation when a movable body is no longer detected, and the length of the section D. For example, a manager of the lighting control system 10 may use the speed limit of the road R to estimate the time taken by a moving body to pass through a detection range of the sensors S2 and S3. During the estimated time, the sensors S2 and S3 are capable of detecting a moving body. The estimated time is set as the detection frequency of the second sensor S2 and the third sensor S3. When a moving body enters the section D, the first sensor S1 detects the entrance of the moving body into the section D. This activates the two light sources L2 and L3 of the second lighting device 12 and the third lighting device 13 that receive the detection result. The second control unit C2 and the third control unit C3 only determine whether or not to keep the two light sources L2 and L3 activated. Thus, the two sensors S2 and S3 do not have to immediately detect a moving body entering the detection range of the two sensors S2 and S3. Accordingly, the detection frequency of the two sensors S2 and S3 in the lighting devices 12 and 13 separated from the two outermost positions is set to be lower than the detection frequency of the two sensors S1 and S4 in the lighting devices 11 and 14 located at the two outermost positions.

The operation of the lighting control system 10 will now be described.

With reference to FIG. 3, an example will be described in which the vehicle V is traveling along the road R from the first lighting device 11 toward the fourth lighting device 14 at a constant speed. The first sensor S1 and the fourth sensor S4 are constantly actuated (turned ON). The light sources L1 to L4 of the lighting devices 11 to 14 are deactivated until the vehicle V enters the detection range of the first sensor S1. When the vehicle V enters the detection range of the first sensor S1, at time t1, the first sensor S1 detects the vehicle V as a moving body. The first sensor S1 generates a detection result indicating the detection of the moving body and sends the detection result to the first control unit C1. When provided with the detection result from the first sensor S1 indicating the detection of the moving body, the first control unit C1 activates the first light source L1. Further, the first control unit C1 sends the detection result indicating the detection of the moving body from the first communication unit A1 to the second communication unit A2. When the second communication unit A2 receives the detection result indicating the detection of the moving body, the second control unit C2 activates the second light source L2. Further, the second control unit C2 sends the detection result indicating the detection of the moving body from the second communication unit A2 to the third communication unit A3. When the third communication unit A3 receives the detection result indicating the detection of the moving body, the third control unit C3 activates the third light source L3. Further, the third control unit C3 sends the detection result indicating the detection of the moving body from the third communication unit A3 to the fourth communication unit A4. When the fourth communication unit A4 receives the detection result indicating the detection of the moving body, the fourth control unit C4 activates the fourth light source L4. Accordingly, the entrance of a moving body into the section D activates the light sources L1 to L4 of every one of the lighting devices 11 to 14. The control units C1 to C4 are configured to deactivate the light sources L1 to L4 when the control units C1 to C4 are not provided with a detection result indicating the detection of a moving body for over a certain period or longer. In the present embodiment, the light sources L1 to L4 are in a bright state when activated and a dimmed state when deactivated.

The second sensor S2 and the third sensor S3 are actuated (turned ON) in fixed cycles for certain periods. Thus, when the second sensor S2 and the third sensor S3 are de-actuated (turned OFF) as the moving body enters the detection range of the second sensor S2 and the third sensor S3, the moving body is not detected. In the present embodiment, as the moving body enters the detection range of the second sensor S2, the second sensor S2 detects the moving body when actuated at time t2. The second sensor S2 provides the second control unit C2 with a detection result indicating the detection of the moving body. In the same manner as when the first sensor S1 detects a moving body, the second control unit C2 sends the detection result indicating the detection of the moving body from the second communication unit A2 to the first communication unit A1, the third communication unit A3, and the fourth communication unit A4. The control units C1 to C4 that receive the detection result indicating the detection of the moving body assume that the moving body is still in the section D and continue to activate the light sources L1 to L4.

As the moving body enters the detection range of the third sensor S3, the third sensor S3 detects the moving body when actuated at time t3. The third sensor S3 provides the third control unit C3 with a detection result indicating the detection of the moving body. In the same manner as when the first sensor S1 detects the moving body, the third control unit C3 sends the detection result indicating the detection of the moving body from the third communication unit A3 to the second communication unit A2, the fourth communication unit A4, and the first communication unit A1. The control units C1 to C4 that receive the detection result indicating the detection of the moving body assume that the moving body is still in the section D and continue to activate the light sources L1 to L4.

When the moving body enters the detection range of the fourth sensor S4, the fourth sensor S4 detects the moving body at time t4. The fourth sensor S4 provides the fourth control unit C4 with a detection result indicating the detection of the moving body. In the same manner as when the first sensor S1 detects the moving body, the fourth control unit C4 sends the detection result indicating the detection of the moving body from the fourth communication unit A4 to the third communication unit A3, the second communication unit A2, and the first communication unit A1. The control units C1 to C4 that receive the detection result indicating the detection of the moving body continue to activate the light sources L1 to L4.

Figure 4:
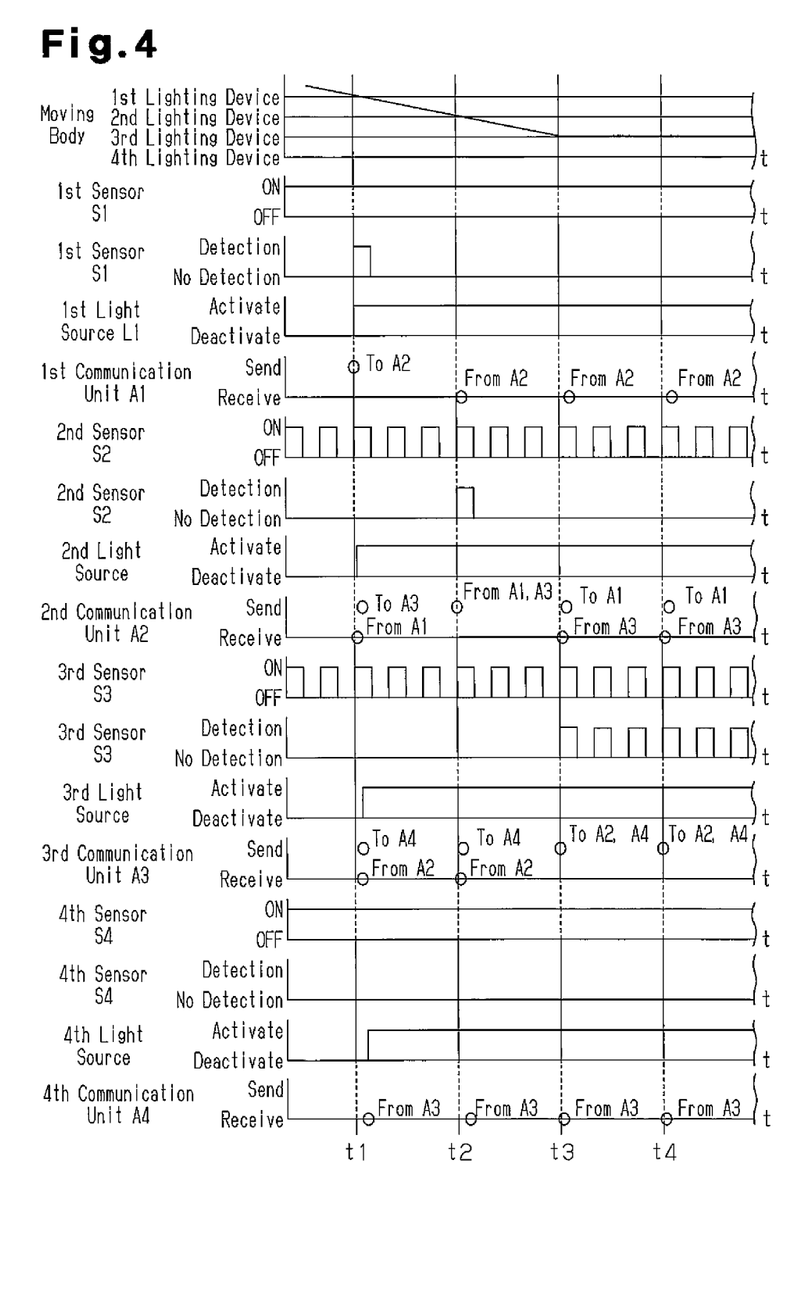
FIG. 4 is a time chart illustrating the control executed by a control unit of the lighting control system.

With reference to FIG. 4, an example will be described in which the vehicle V stops at the third lighting device 13 after travelling at a certain speed, and the driver then exits the vehicle V and walks around the third lighting device 13. In this case, the third lighting device 13 detects the driver in fixed cycles (whenever the third sensor S3 is actuated). The third control unit C3 sends a detection result indicating the detection of the vehicle as a moving body from the third communication unit A3 to the second communication unit A2 and the fourth communication unit A4. This keeps the light sources L1 to L4 of the lighting devices 11 to 14 activated. In this case, the moving body includes the vehicle V and the driver.

In the foregoing description, the moving body travels from the first lighting device 11 toward the fourth lighting device 14. However, a similar control is executed when the moving body travels from the fourth lighting device 14 toward the first lighting device 11.

The lighting control system of the above embodiment has the advantages described below.

(1) The detection frequencies of the first sensor S1 in the first lighting device 11 and the fourth sensor S4 in the fourth lighting device 14 are higher than the detection frequencies of the second sensor S2 in the second lighting device 12 and the third sensor S3 in the third lighting device 13. This allows for a shorter actuation time (ON time) of the second sensor S2 and the third sensor S3 in the two lighting devices 12 and 13 that are separated from the two outermost positions, and decreases power consumption of the two lighting devices 12 and 13. As a result, power consumption of the entire lighting control system 10 is decreased. Further, when a moving body (vehicle or person) enters the section D in which the lighting devices 11 to 14 are arranged, the first sensor S1 of the first lighting device 11 or the fourth sensor S4 of the fourth lighting device 14, where the movable body first passes by, accurately detects the moving body entering the section D. The detection result indicating the detection of the moving body is sent to the other lighting devices 11 to 14 through the four communication units A1 to A4 to activate the four light sources L1 to L4. When the four light sources L1 to L4 of the four lighting devices 11 to 14 have been activated after the moving body enters the section D, it is determined whether or not to continue activating the four lighting devices 11 to 14. Thus, even though the detection frequencies of the second sensor S2 and the third sensor S3 are lower than the detection frequencies of the first sensor S1 and the fourth sensor S4, the four light sources L1 to L4 are activated when the moving body is present in the section D. This allows for a decrease in the power consumption of the four lighting devices 11 to 14. Further, the four light sources L1 to L4 may be accurately activated when the moving body enters the section D.

(2) When the sensors S1 to S4 detect a moving body, the corresponding control units C1 to C4 send a detection result indicating the detection of the moving body to the adjacent lighting devices 11 to 14. Thus, when receiving the detection result indicating the detection of the moving body, each of the controls units C1 to C4 may determine whether or not the corresponding one of the lighting devices 11 to 14 are located at one of the two outermost positions. The two lighting devices 11 and 14 arranged at the two outermost positions are each adjacent to only one lighting device, namely, the lighting device 12 or the lighting device 13. Thus, when each of the control units C1 to C4 send a detection result indicating the detection of a moving body from the corresponding communication units A1 to A4 and two communication units receive the detection result, each of the control units C1 to C4 recognize that the corresponding lighting devices 11 to 14 are separated from the two outermost positions. Further, when each of the control units C1 to C4 sends a detection result indicating the detection of a moving body from the corresponding communication units A1 to A4 and one communication unit receives the detection result, the control units C1 to C4 recognize that the corresponding lighting devices 11 to 14 are located at the two outermost positions.

It should be apparent to those skilled in the art that the present invention may be embodied in many other specific forms without departing from the spirit or scope of the invention. Particularly, it should be understood that the present invention may be embodied in the following forms.

Figure 5:
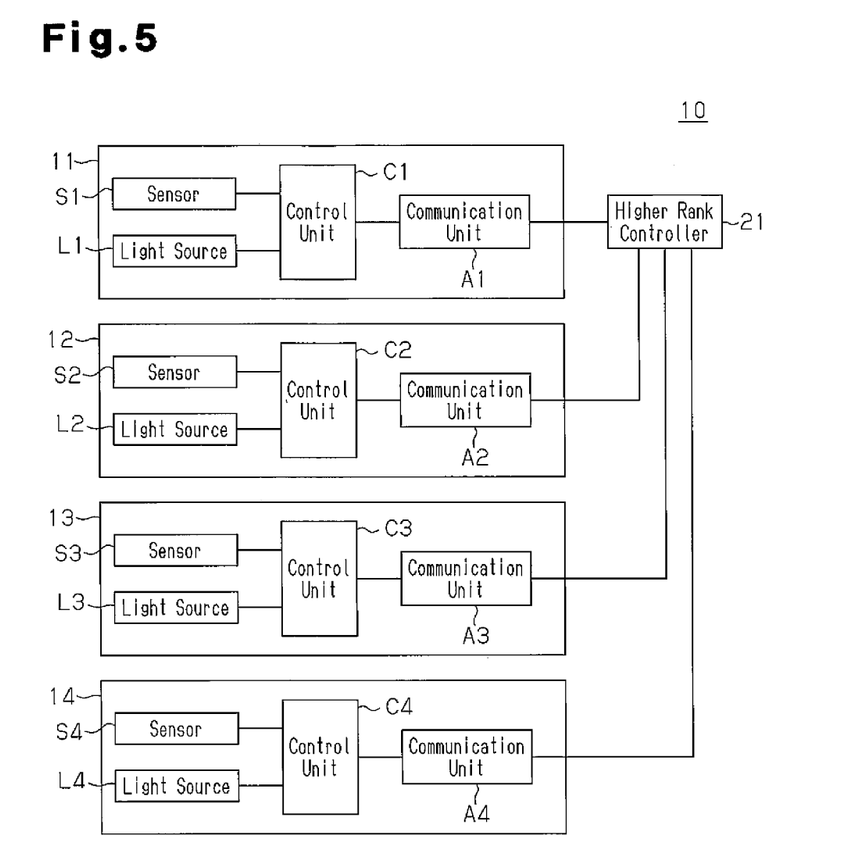
FIG. 5 is a block diagram showing the electrical configuration of a further example of the lighting control system.

Referring to FIG. 5, the communication units A1 to A4 may be connected to a higher rank controller 21, and the lighting devices 11 to 14 may be controlled by the higher rank controller 21. In this case, the higher rank controller 21 determines whether or not each the lighting devices 11 to 14 are located at the two outermost positions.

In the above embodiment, when the sensors S1 to S4 of any of the lighting devices 11 to 14 detect a moving body, a detection result indicating the detection of the moving body is provided to the control units C1 to C4 of every one of the lighting devices 11 to 14. However, any number of the lighting devices 11 to 14 may be connected to one another by the communication units A1 to A4.

In the above embodiment, when the lighting devices 11 to 14 are arranged on a one-way road or the like that allows the travelling direction of a moving body to be predicted, the detection frequency may be increased for only the sensor S1 of the first lighting device 11 or the sensor S4 of the fourth lighting device 14 that are located at the outermost positions.

In the above embodiment, four lighting devices 11 to 14 are used. However, as long as there is at least two, the number of the lighting devices 11 to 14 may be increased or decreased.

In the above embodiment, the light sources L1 to L4 may be in a dimmed state when the output of the light sources L1 to L4 are lower than that of a bright state. Accordingly, when the control units C1 to C4 do not detect a moving body, the light sources L1 to L4 may be adjusted so that the output is lower than that of a bright state.

In the above embodiment, the control units C1 to C4 determine whether or not the corresponding lighting devices 11 to 14 are arranged at one of the two outermost positions to set the detection frequencies of the sensors S1 to S4. Instead, the memories of the control units C1 to C4 may store, in advance, information of whether or not the corresponding lighting devices 11 to 14 are arranged at any one of the two outermost positions.

In the above embodiment, the detection frequencies of the sensors S1 and S4 may be low as long as the entrance of a moving body into the section D may be accurately detected.

In the above embodiment, the control units C1 to C4 check the connection conditions of the communication units A1 to A4. However, the manager of the lighting control system may set the connection conditions of the communication units A1 to A4 in advance.

In the above embodiment, the control units C1 to C4 sets the detection frequencies of the sensors S1 to S4. However, the manager of the lighting control system may set the detection frequencies of the sensors S1 to S4 in advance.

In the above embodiment, when the moving body enters the section D from an intermediate position of the section D, the second sensor S2 and the third sensor S3 detects the moving body and activates the light sources L1 to L4 based on the detection result.

The present examples and embodiments are to be considered as illustrative and not restrictive, and the invention is not to be limited to the details given herein, but may be modified within the scope and equivalence of the appended claims.

The invention claimed is:

1. A lighting control system comprising:
a plurality of lighting devices arranged along a road for a moving body, wherein each of the lighting devices includes
a light source that emits light,
a sensor that detects the moving body,
a control unit provided with a detection result of the sensor, and
a communication unit that sends and receives the detection result of the sensor to and from the communication unit of at least one of the other lighting devices,
wherein when the control unit of each lighting device receives the detection result indicating the detection of the moving body, the control unit controls the light source to be in a bright state and sends the detection result indicating the detection of the moving body from the corresponding communication unit to at least one of the other lighting devices,
when the control unit of each lighting device receives the detection result indicating the detection of the moving body through the corresponding communication unit from another one of the lighting devices, the control unit controls the corresponding light source to be in a bright state, and
the sensor of the one of the lighting devices located in at least at one outermost position of the lighting devices is set to have a higher detection frequency than the sensors of the other lighting devices.

2. The lighting control system according to claim 1, when each control unit of the lighting devices receives the detection result of the corresponding sensor, and the control unit sends the detection result to the sensor of an adjacent one of the lighting devices.

3. The lighting control system according to claim 1, wherein each control unit of the lighting devices determines whether or not the corresponding lighting device is located at one of two outermost positions of the lighting devices to set the detection frequency of the corresponding sensor.

4. The lighting control system according to claim 1, wherein each control unit of the lighting devices determines whether or not the corresponding communication unit is connected to one communication unit, and when determining that the corresponding communication unit is connected to one communication unit, the control unit determines that the corresponding lighting device is located at an outermost position of the lighting devices.

5. The lighting control system according to claim 1, wherein the sensors of two of the lighting devices located at two outermost positions of the lighting devices have a higher detection frequency than the sensors of the other lighting devices.

6. The lighting control system according to claim 1, wherein the sensor of the one of the lighting devices located in at least at one outermost position of the lighting devices has a detection frequency allowing for constant detection.

* * * * *